(12) United States Patent
Aoki (10) Patent No.: US 11,718,729 B2
(45) Date of Patent: Aug. 8, 2023

(54) INSULATING FILLER AND PRODUCTION METHOD THEREFOR, INSULATING MATERIAL CONTAINING SAID INSULATING FILLER AND PRODUCTION METHOD THEREFOR

(71) Applicant: NIPPON AEROSIL CO., LTD., Tokyo (JP)

(72) Inventor: Masao Aoki, Mie (JP)

(73) Assignee: NIPPON AEROSIL CO., LTD., Tokyo (JP)

( * ) Notice: Subject to any disclaimer, the term of this patent is extended or adjusted under 35 U.S.C. 154(b) by 0 days.

(21) Appl. No.: 17/913,971

(22) PCT Filed: Mar. 24, 2021

(86) PCT No.: PCT/JP2021/012147
§ 371 (c)(1),
(2) Date: Sep. 23, 2022

(87) PCT Pub. No.: WO2021/193690
PCT Pub. Date: Sep. 30, 2021

(65) Prior Publication Data
US 2023/0118996 A1  Apr. 20, 2023

(30) Foreign Application Priority Data

Mar. 26, 2020  (JP) ................................ 2020-055633

(51) Int. Cl.
| | | |
|---|---|---|
| C08K 3/22 | (2006.01) | |
| C08K 3/36 | (2006.01) | |
| C08J 3/20 | (2006.01) | |
| C08K 3/28 | (2006.01) | |
| C08K 3/38 | (2006.01) | |

(52) U.S. Cl.
CPC ................ C08K 3/22 (2013.01); C08J 3/203 (2013.01); C08K 3/36 (2013.01); *C08J 2363/00* (2013.01); *C08J 2367/00* (2013.01); *C08J 2383/04* (2013.01); *C08K 2003/222* (2013.01); *C08K 2003/282* (2013.01); *C08K 2003/385* (2013.01); *C08K 2201/003* (2013.01); *C08K 2201/005* (2013.01); *C08K 2201/011* (2013.01); *C08K 2201/014* (2013.01)

(58) Field of Classification Search
CPC ...... C08K 3/22; C08K 3/36; C08K 2003/282; C08K 2003/385; C08K 2201/005; C08J 3/203; C08J 2363/00; C08J 2367/00; C08J 2383/04
See application file for complete search history.

(56) References Cited

U.S. PATENT DOCUMENTS

| | | |
|---|---|---|
| 2005/0048296 A1 | 3/2005 | Meguriya et al. |
| 2010/0297453 A1 | 11/2010 | Maenaka et al. |
| 2014/0061530 A1 | 3/2014 | Ohno et al. |
| 2017/0305749 A1 | 10/2017 | Jeon et al. |
| 2019/0292349 A1 | 9/2019 | Ito |

FOREIGN PATENT DOCUMENTS

| | | |
|---|---|---|
| CN | 103492311 A | 1/2014 |
| CN | 105542447 A | 5/2016 |
| CN | 105924952 A | 9/2016 |
| CN | 107001055 A | 8/2017 |
| CN | 109312159 A | 2/2019 |
| JP | 07-033415 A | 2/1995 |
| JP | 2005-70409 A | 3/2005 |
| JP | 2006-151778 A | 6/2006 |
| JP | 2007-182493 A | 7/2007 |
| JP | 2008-293911 A | 12/2008 |
| JP | 2011-68757 A | 4/2011 |
| JP | 2011-070930 A | 4/2011 |
| JP | 2012-211225 A | 11/2012 |
| JP | 2016-169281 A | 9/2016 |
| JP | 2017-141386 A | 8/2017 |
| JP | 2020-132827 A | 8/2020 |
| TW | 200924967 A | 6/2009 |
| WO | 2009/031536 A1 | 12/2009 |

OTHER PUBLICATIONS

International Search Report issued in International Bureau of WIPO Patent Application No. PCT/JP2021/012147, dated Jun. 8, 2021, together with an English translation.
Written Opinion of the International Searching Authority (PCT/ISA/237) issued in International Bureau of WIPO Patent Application No. PCT/JP2021/012147, dated Jun. 8, 2021, together with an English translation.
Office Action issued in Chinese Patent Application No. 202180023347.6 dated Jan. 12, 2023, along with English translation thereof.
Office Action issued in Taiwanese Patent Application No. 110110599 dated Nov. 17, 2022, along with English translation thereof.

*Primary Examiner* — Edward J Cain
(74) *Attorney, Agent, or Firm* — Greenblum & Bernstein, P.L.C.

(57) ABSTRACT

An insulating filler composed of a mixed powder in which a hydrophobic fumed oxide powder having an average primary particle size $D_1$, which is smaller than an average primary particle size $D_2$, is adhered to the surface of a magnesium oxide powder and/or a nitride-based inorganic powder having the average primary particle size $D_2$, wherein: the ratio $D_1/D_2$ of the average primary particle size $D_1$ to the average primary particle size $D_2$ is $6 \times 10^{-5}$ to $3 \times 10^{-3}$; the volume resistivity of the mixed powder is $1 \times 10^{11}$ Ω·m or more; and the content ratio of the hydrophobic fumed oxide powder in the mixed powder is 5-30 mass %. Also provided is an insulating material in which the above-mentioned insulating filler is contained in a resin molded body.

7 Claims, 3 Drawing Sheets

INSULATING FILLER AND PRODUCTION METHOD THEREFOR, INSULATING MATERIAL CONTAINING SAID INSULATING FILLER AND PRODUCTION METHOD THEREFOR

TECHNICAL FIELD

The present invention relates to an insulating filler containing a magnesium oxide powder and a nitride-based inorganic powder such as aluminum nitride, boron nitride, silicon nitride, etc., as main components, which have high water resistance in addition to high thermal conductivity and a method for producing the same. In addition, it relates to an insulating material containing the insulating filler and a method for producing the same. Incidentally, in the present specification, "insulating property" means electrically insulating property, and "insulating material" means a material having electrically insulating property.

Incidentally, the present application claims priority of Japanese Patent Application No. 2020-055633 filed in Japan on Mar. 26, 2020, and the contents thereof are incorporated herein by reference.

BACKGROUND ART

Until now, insulating materials having high thermal conductivity, which contain this kind of insulating filler have been utilized in cooling members for heating elements comprising semiconductor chips, transistors, lithium ion secondary batteries or LED light sources of communication devices and in-vehicle electronic devices, in cooling members for stators built in housings of motors, in cooling members for power conversion devices built in cases of inverters, or in heat radiating members for releasing heat generated in sliding portions or rotating portions of actuators, etc.

Magnesium oxide (MgO) powder, which is one of the materials of insulating fillers, is excellent in thermal conductivity and electric insulation, etc., is inexpensive as compared with aluminum nitride powder and boron nitride powder, has a light specific gravity, and has low Mohs hardness so that it is excellent in handling. Due to such characteristics, a magnesium oxide powder is suitable as an insulating filler having thermal conductivity. However, magnesium oxide has a property that it is hydrolyzed by easily reacting with water to change into magnesium hydroxide.

Also, nitride-based inorganic powders such as aluminum nitride (AlN) powder, boron nitride (BN) powder, silicon nitride ($Si_3N_4$) powder, etc., which are other materials of insulating fillers, have a light specific gravity, and are excellent in thermal conductivity and electric insulation, etc. Because of such characteristics, the nitride-based inorganic powder is suitable as an insulating filler having thermal conductivity. However, a nitride, including an aluminum nitride powder, has high reactivity with water, so that it has properties that when it comes into contacted with water, it is hydrolyzed to be decomposed to a hydrate such as hydrated aluminum, etc., while generating ammonia.

Hydrolysis of these magnesium oxide (MgO) or nitrides (AlN, BN, $Si_3N_4$) proceeds by the moisture in the atmosphere, so that when a magnesium oxide powder or a nitride-based inorganic powder is used as an insulating filler under an atmosphere of high temperature and high humidity, there is a problem that the quality as an insulating filler is markedly lowered. This is the same in the insulating material comprising a resin molded body containing a magnesium oxide powder or a nitride-based inorganic powder in a resin, and there is a fear that magnesium oxide (MgO) or nitrides (AlN, BN, $Si_3N_4$) is/are reacted with a water content, etc., in the resin, in addition to the moisture in the atmosphere, to deteriorate the quality of the insulating material comprising the resin molded body.

In order to solve this problem, it has been known a method of chemically modifying the surface of the magnesium oxide (MgO) powder or aluminum nitride (AlN) powder to improve the reactivity with water and to heighten water resistance. As an example thereof, there is disclosed a phosphorus-containing coated magnesium oxide powder which comprises a coated magnesium oxide powder having a coating layer comprising a composite oxide on the surface thereof and further a coating layer comprising a magnesium phosphate-based compound on at least a part of the surface thereof, and a content of the magnesium phosphate-based compound based on the coated magnesium oxide powder is 0.1 to 10% by mass in terms of phosphorus (for example, see Patent Document 1 (claim 1).).

Also, as other examples, there is disclosed aluminum nitride powder having excellent water resistance in which aluminum nitride powder having an aluminum oxide coating layer or a phosphoric acid-based coating layer on the surface thereof is treated with an organic silicon-based coupling agent, an organic phosphoric acid-based coupling agent, or an organic titanium-based coupling agent by adding in an amount of 0.1 to 10 parts by weight based on 100 parts by weight of the aluminum nitride powder (for example, see Patent Document 2 (claim 1).).

On the other hand, there is disclosed a high thermal conductive insulating material in which aggregates formed by aggregating a relatively small-sized filler around a relatively large-sized filler are dispersed in a polymer base material (for example, Patent Document 3 (see claims 1 and 2, paragraphs [0010], [0015] to [0017], [0023], FIG. 1, FIG. 2).). In this high thermal conductive insulating material, the polymer base material comprises any one kind of silicone, Nylon, PP (polypropylene), PPS (polyphenylene sulfide) and LCP (liquid crystal polymer), and the filler comprises any one kind of silicon carbide, silicon nitride, boron nitride, silica, aluminum oxide, aluminum nitride and magnesium oxide or a mixture thereof. Also, when the relatively large-sized filler is spherical or substantially spherical, the particle size can be formed to be about 1 to 100 μm, and the particle size of the small-sized filler can be formed to be about 0.1 to 10 μm. Further, the aggregates described in Patent Document 3 can be formed by, after forming a coarse filler, a part thereof is pulverized to be subdivided and classified, etc., to form a fine filler having a predetermined size, and these coarse filler and fine filler are mixed.

In the high thermal conductive insulating material constituted by the above, heat transfer efficiency between the polymer and the filler can be heightened without increasing the amount of the filler to be filled or increasing the size of the filler. This means that, as compared with the conventional insulating material in which the coarse filler having uniform size is dispersed in the polymer, a distance between the fillers necessary for obtaining an equal amount of heat transferred can be elongated and an amount of the filler to be filled can be reduced. Since the amount of the filler to be filled can be reduced, the moldability can be heightened. In addition, the aggregates have a grain structure in which small-sized fillers randomly protrude from the outer periphery of the large-sized fillers, so that the heat transfer direction becomes various direction (isotropic) without having an arbitrary one direction (anisotropic). Further, small-sized fillers can exhibit an anchor effect by embedding in the polymer, and as a result, interfacial strength between the polymer and the filler aggregates is heightened, so that mechanical strength of the insulating material can be heightened.

PRIOR ART DOCUMENTS

Patent Documents

Patent Document 1: JP 2006-151778A
Patent Document 2: JP Hei.7-33415A
Patent Document 3: JP 2008-293911A

DISCLOSURE OF INVENTION

Problem to be Solved by the Invention

Although both the phosphorus-containing coated magnesium oxide (MgO) powder shown in Patent Document 1 and the aluminum nitride (AlN) powder shown in Patent Document 2 have improved water resistance with a certain extent, water resistance under high temperature and high humidity conditions cannot be said to be sufficient, and improvement in water resistance has been required to both powders. Also, in an insulating material comprising a resin molded body containing such a powder in a resin, and the high thermal conductive insulating material shown in Patent Document 3, when the insulating material is immersed in water for a long time, there is a problem that a rate of change (absolute value) of the dielectric breakdown voltage before and after immersion is large.

An object of the present invention is to provide an insulating filler in which volume resistivity due to moisture absorption is difficultly lowered and a method for producing the same. Another object of the present invention is to provide an insulating material in which a rate of change (absolute value) of the dielectric breakdown voltage before and after immersion is a little and a method for producing the same.

Means for Solving Problem

A first aspect of the present invention is directed to an insulating filler which comprises a mixed powder in which on a surface of a magnesium oxide powder and/or a nitride-based inorganic powder having an average primary particle size $D_2$, a hydrophobic fumed oxide powder having an average primary particle size $D_1$ which is smaller than the average primary particle size $D_2$ is attached, wherein a ratio $D_1/D_2$ of the average primary particle size $D_1$ to the average primary particle size $D_2$ is $6 \times 10^{-5}$ to $3 \times 10^{-3}$, wherein volume resistivity of the mixed powder is $1 \times 10^{11}$ Ω·m or more, and wherein a content ratio of the hydrophobic fumed oxide powder is 5% by mass to 30% by mass when the mixed powder is made 100% by mass.

A second aspect of the present invention is an insulating filler which is an invention based on the first aspect, wherein the nitride-based inorganic powder is one or more kinds of powders selected from the group consisting of an aluminum nitride powder, a boron nitride powder and a silicon nitride powder.

A third aspect of the present invention is an insulating filler which is an invention based on the first aspect, wherein the hydrophobic fumed oxide is hydrophobic fumed silica, hydrophobic fumed alumina or hydrophobic fumed titania.

A fourth aspect of the present invention is an insulating filler which is an invention based on any of the first to third aspects, wherein when water vapor is absorbed under a constant temperature and constant humidity of a temperature of 32° C. and a relative humidity of 80% for 16 days, a lowering rate (%) of volume resistivity by moisture absorption calculated by the following equation (1) is less than +50%.

Lowering rate (%) of volume resistivity by moisture absorption=[(volume resistivity before moisture absorption −volume resistivity after moisture absorption)/volume resistivity before moisture absorption]×100 (1)

A fifth aspect of the present invention is a method for producing an insulating filler by mixing a magnesium oxide powder and/or a nitride-based inorganic powder having an average primary particle size $D_2$, and a hydro-phobic fumed oxide powder having an average primary particle size $D_1$ which is smaller than the average primary particle size $D_2$ under room temperature by a dry method, wherein a ratio $D_1/D_2$ of the average primary particle size $D_1$ to the average primary particle size $D_2$ is $6 \times 10^{-5}$ to $3 \times 10^{-3}$.

A sixth aspect of the present invention is an insulating material comprising a resin molded body, wherein the insulating filler described in any of the first to fourth aspects is contained in the resin molded body, and wherein when the resin molded body is immersed in water at a temperature of 50° C. for 120 hours, a rate of change (absolute value) of the dielectric breakdown voltage before and after immersion calculated by the following equation (2) is 5% or less.

Rate of change (%) in dielectric breakdown voltage due to immersion=[(dielectric breakdown voltage before immersion−dielectric breakdown voltage after immersion)/dielectric breakdown voltage before immersion]×100 (2)

A seventh aspect of the present invention is a method for producing an insulating material which comprises mixing the insulating filler described in any of the first to fourth aspects and a resin under room temperature, and then, molding to produce a resin molded body having a rate of change (absolute value) of the dielectric breakdown voltage before and after immersion calculated by the above-mentioned equation (2) of 5% or less.

Effect of the Invention

The insulating filler of the first aspect of the present invention comprises a mixed powder in which, on the surface of a magnesium oxide powder and/or a nitride-based inorganic powder, a hydrophobic fumed oxide powder having an average primary particle size $D_1$ smaller than an average primary particle size $D_2$ of the powder is attached, also a ratio $D_1/D_2$ is $6 \times 10^{-5}$ to $3 \times 10^{-3}$, and further a content ratio of the hydrophobic fumed oxide powder is 5% by mass to 30% by mass in the mixed powder, so that the volume resistivity of the mixed powder is $1 \times 10^{11}$ Ω·m or more, and even when the hydrophobic fumed oxide powder is in a high humidity atmosphere, a moisture absorption amount of the magnesium oxide powder and/or the nitride-based inorganic powder can be reduced. Therefore, the insulating filler has a merit that the volume resistivity due to moisture absorption is difficultly lowered.

In the insulating filler of the second aspect of the present invention, the nitride-based inorganic powder is an aluminum nitride powder, a boron nitride powder or a silicon nitride powder, so that the insulating filler has, in addition to high water resistance, high thermal conductivity and high electric insulation.

In the insulating filler of the third aspect of the present invention, the hydrophobic fumed oxide is hydrophobic fumed silica, hydrophobic fumed alumina or hydrophobic fumed titania, so that the insulating filler has higher water resistance.

In the insulating filler of the fourth aspect of the present invention, the lowering rate (%) of volume resistivity by moisture absorption calculated by the above-mentioned equation (1) is less than +50%, so that the rate of change in the volume resistivity due to moisture absorption is a little.

In the method for producing the insulating filler of the fifth aspect of the present invention, owing to production of an insulating filler by mixing a magnesium oxide powder and/or a nitride-based inorganic powder having an average primary particle size $D_2$, and a hydrophobic fumed oxide powder having an average primary particle size $D_1$ which is smaller than the above-mentioned average primary particle size $D_2$ under room temperature by the dry method, the hydrophobic fumed oxide powder is attached on the surface of the magnesium oxide powder and/or the nitride-based inorganic powder with a relatively simple method. The insulating filler produced by the method has a merit that volume resistivity due to moisture absorption is difficultly lowered.

In the insulating material of the sixth aspect of the present invention, the insulating filler described in any of the first to the fourth aspects is contained in the resin molded body, so that the resin molded body has a merit that the rate of change (absolute value) of the dielectric breakdown voltage before and after immersion is a little.

In the method for producing the insulating material of the seventh aspect of the present invention, the insulating material comprising the resin molded body is produced by mixing the insulating filler described in any of the first to the fourth aspects and a resin under room temperature and then molding, so that the produced insulating material has a merit that the rate of change (absolute value) of the dielectric breakdown voltage before and after immersion is a little.

BEST MODE(S) FOR CARRYING OUT THE INVENTION

Next, a mode for carrying out the present invention will be explained with reference to the drawings. The insulating filler of the present embodiment comprises a mixed powder in which, on the surface of a magnesium oxide powder and/or a nitride-based inorganic powder (hereinafter sometimes referred to as a large-diameter powder.) having an average primary particle size $D_2$, a hydrophobic fumed oxide powder (hereinafter sometimes referred to as a small-diameter powder.) having an average primary particle size $D_1$ which is smaller than the average primary particle size $D_2$ is attached. And, a ratio $D_1/D_2$ of the average primary particle size $D_1$ to the average primary particle size $D_2$ is $6 \times 10^{-5}$ to $3 \times 10^{-3}$, and preferably $9 \times 10^{-4}$ to $1 \times 10^{-3}$. In addition, the volume resistivity of the above-mentioned mixed powder is $1 \times 10^{11}$ Ω·m or more, and preferably $3 \times 10^{11}$ Ω·m to $5 \times 10^{13}$ Ω·m. Further, a content ratio of the hydrophobic fumed oxide powder is preferably 5% by mass to 30% by mass, and further preferably 5% by mass to 26% by mass when the mixed powder is made 100% by mass.

Incidentally, as the large-diameter powder having an average primary particle size $D_2$, there may be exemplified by a magnesium oxide powder and/or a nitride-based inorganic powder capable of causing chemical change by moisture absorption. As the nitride-based inorganic powder, an aluminum nitride powder, a boron nitride powder and a silicon nitride powder, etc., may be exemplified. The large-diameter powder is one or more kinds of powders selected from the group consisting of a magnesium oxide powder, an aluminum nitride powder, a boron nitride powder and a silicon nitride powder.

As the hydrophobic fumed oxide powder which is a small-diameter powder having an average primary particle size $D_1$, there may be exemplified by hydrophobic fumed silica, hydrophobic fumed alumina or hydrophobic fumed titania. The mixed powder of the present embodiment is not limited to a powder in which a single kind of a large-diameter powder and a single kind of a small-diameter powder are mixed, but also a powder in which plural kinds of large-diameter powders and a single kind of a small-diameter powder are mixed, or a powder in which a single kind of a large-diameter powder and plural kinds of small-diameter powders are mixed, etc. The combination of these powders is selected according to the use of the insulating filler and the required water resistance, thermal conductivity, electric insulation, etc.

The average primary particle size $D_1$ of the hydrophobic fumed oxide powder is measured by the image analysis method of a transmission electron microscope (TEM), and the average primary particle size $D_2$ of the magnesium oxide powder or the nitride-based inorganic powder is the nominal value of each powder manufacturer. Also, the volume resistivity of the mixed powder is measured by using a high resistance resistivity meter "Hiresta-UX" (manufactured by Mitsubishi Chemical Analytech Co., Ltd.: model number "MCP-HT800") and a powder resistance measurement system (manufactured by Mitsubishi Chemical Analytech Co., Ltd.: model number "MCP-PD-51").

Here, the reason why the ratio $D_1/D_2$ of the average primary particle size $D_1$ of the hydrophobic fumed oxide powder and the average primary particle size $D_2$ of the magnesium oxide powder and/or the nitride-based inorganic powder is set in the range of $6 \times 10^{-5}$ to $3 \times 10^{-3}$ is that if it is less than $6 \times 10^{-5}$, water resistance of the insulating filler is not sufficient, while if it exceeds $3 \times 10^{-3}$, electric insulation cannot be improved. Also, the reason why the volume resistivity of the above-mentioned mixed powder is limited to $1 \times 10^{11}$ Ω·m or more is that if it is less than $1 \times 10^{11}$ Ω·m, electric insulation ability is insufficient. Further, the reason why the preferred upper value of the volume resistivity of the above-mentioned mixed powder is set to be $5\times10^{13}$ Ω·m is that if it exceeds $5\times10^{13}$ Ω·m, the electrical insulation property becomes more than necessary and cost effectiveness is lowered. Moreover, the reason why the preferred content ratio of the hydrophobic fumed oxide powder is limited within the range of 5% by mass to 30% by mass in the mixed powder, if it is less than 5% by mass, water resistance and electrical insulation property of the insulating filler are difficultly improved, while if it exceeds 30% by mass, sufficient thermal conductivity and electrical insulation property are difficultly obtained.

Incidentally, the average primary particle size $D_1$ of the hydrophobic fumed oxide powder is preferably 7 nm to 40 nm, and further preferably 12 nm to 40 nm. Also, the average primary particle size $D_2$ of the magnesium oxide powder and/or the nitride-based inorganic powder is preferably 15 μm to 120 μm, and further preferably 20 μm to 108 μm. Here, the reason why the preferred range of the average primary particle size $D_1$ of the hydrophobic fumed oxide powder is limited to the range of 7 nm to 40 nm is that if it is less than 7 nm, water resistance of the insulating filler is difficult to be improved sufficiently, while if it exceeds 40 nm, electric insulation of the insulating filler is difficult to be improved sufficiently. In addition, the reason why the preferred range of the average primary particle size $D_2$ of the magnesium oxide powder and/or nitride-based inorganic powder is limited to the range of 15 μm to 120 μm is that if it is less than 15 μm, sufficient thermal conductivity and electrical insulation property can be difficultly obtained, while if it exceeds 120 μm, it becomes difficult to achieve closest packing.

Figure 1:
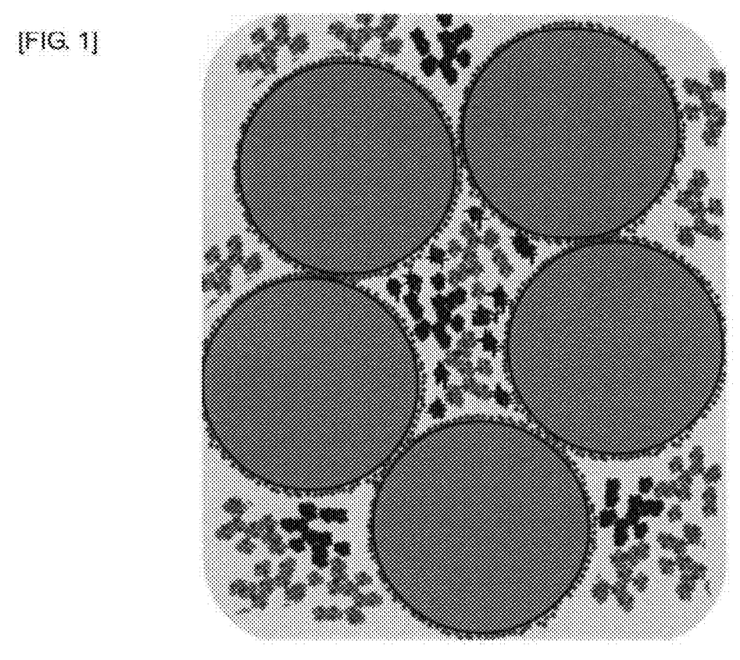
FIG. 1 is a schematic diagram of the insulating filler comprising the mixed powder in which a hydrophobic fumed oxide powder having an average primary particle size smaller than the average primary particle size of the powder is attached on a surface of a magnesium oxide powder and/or a nitride-based inorganic powder according to the embodiment of the present invention.
Figure 2:
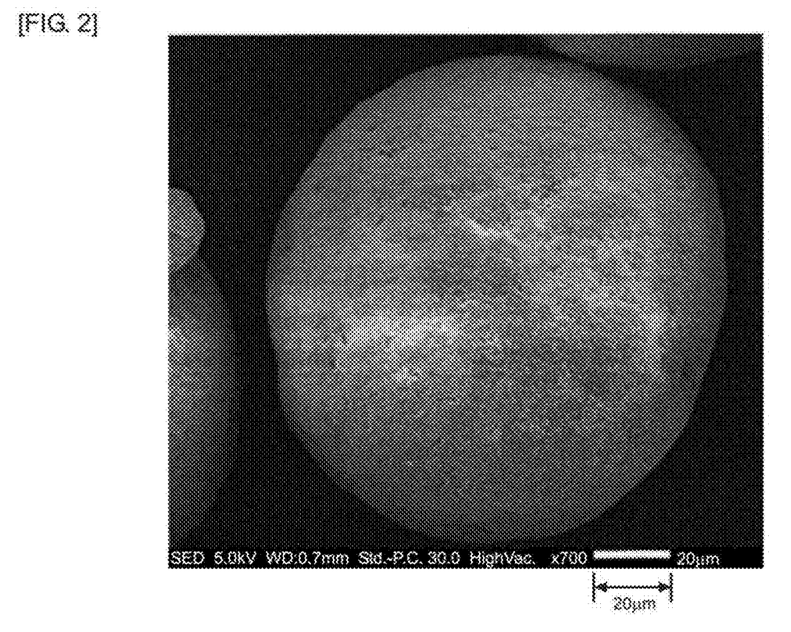
FIG. 2 is a scanning electron microscope (SEM) photographic diagram in which one of the five mixed powders shown in FIG. 1 is enlarged and photographed.
Figure 3:
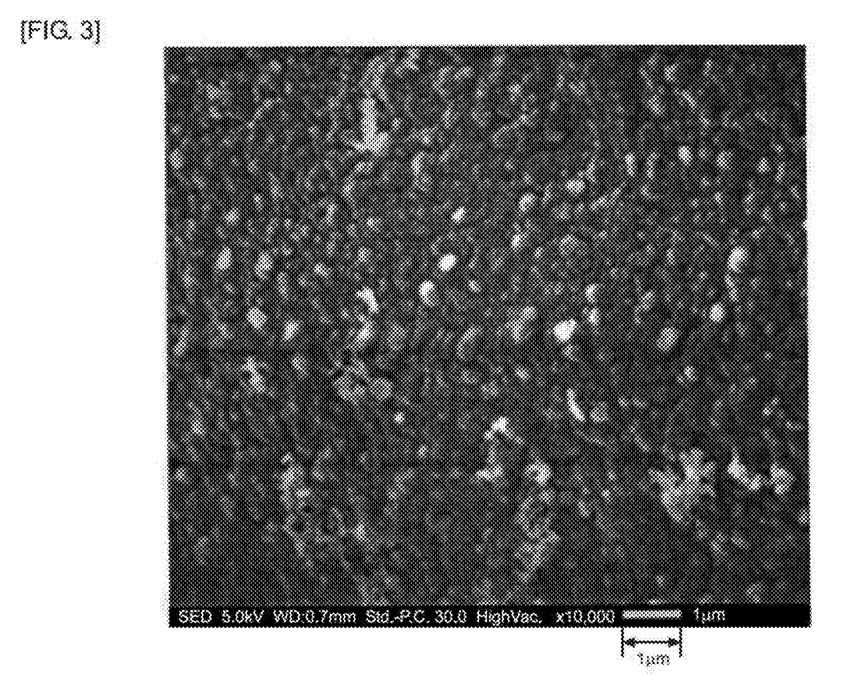
FIG. 3 is a SEM photographic diagram in which the surface of the mixed powder shown in FIG. 2 is enlarged.

In the insulating filler constituted as mentioned above, if the ratio $D_1/D_2$ of the average primary particle size $D_1$ of the hydrophobic fumed oxide powder and the average primary particle size $D_2$ of the magnesium oxide powder and/or the nitride-based inorganic powder is in the above-mentioned range, and the content ratio of the hydrophobic fumed oxide powder is in the above-mentioned range, for example, as shown in the schematic diagram of FIG. 1, the small-diameter hydrophobic fumed oxide powder is densely packed between the large-diameter magnesium oxide powder and/or nitride-based inorganic powder, the small-diameter hydrophobic fumed oxide powder is attached on the surface of the large-diameter magnesium oxide powder and/or nitride-based inorganic powder and the small-diameter hydrophobic fumed oxide powder is connected in a bead shape in the voids between the large-diameter magnesium oxide powder and/or nitride-based inorganic powder to form a three-dimensional network structure by the small-diameter hydrophobic fumed oxide powder in the voids. As a result, the volume resistivity of the mixed powder of the small-diameter filler and the large-diameter filler can be dramatically heightened to $1\times10^{11}$ Ω·m or more without impairing thermal conductivity and simultaneous-ly water resistance of the insulating filler can be improved. As a result, high thermal conductivity and high electric insulation of the insulating filler, which are contrary to each other, can be both achieved at a high level, and the insulating filler can be made highly water resistant. In FIG. 2, it is shown a mixed powder in which one of the five mixed powders shown in FIG. 1 is photographed by a scanning electron microscope (SEM). Further, FIG. 3 is an enlarged SEM photographic diagram of the surface of the mixed powder shown in FIG. 2, and in FIG. 3, it is clearly shown that a large number of the small-diameter powders are densely coated on the surface of the large-diameter powder.

Figure 4:
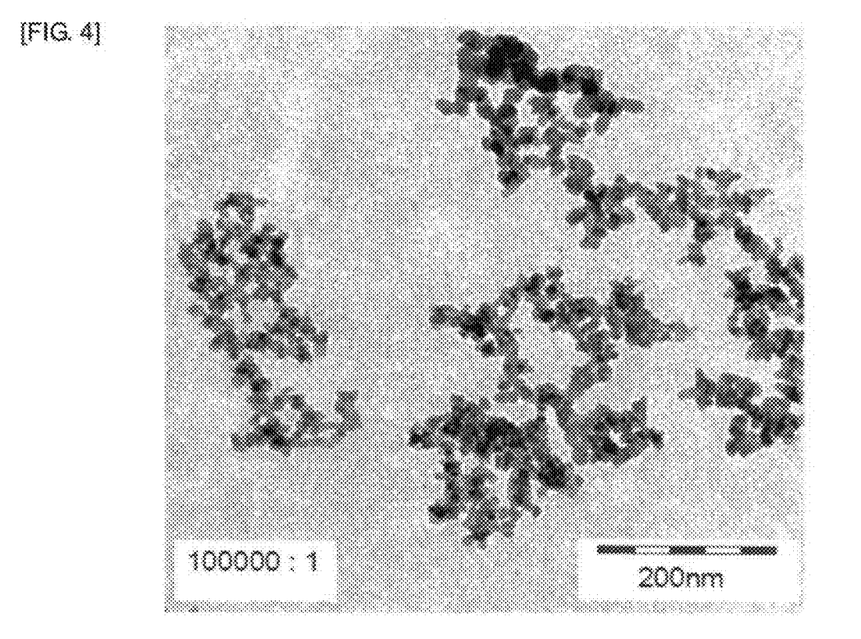
FIG. 4 is a scanning electron microscope (SEM) photographic diagram showing aggregated particles which are the smallest particle form in which primary particles of silica are sintered.
Figure 5:
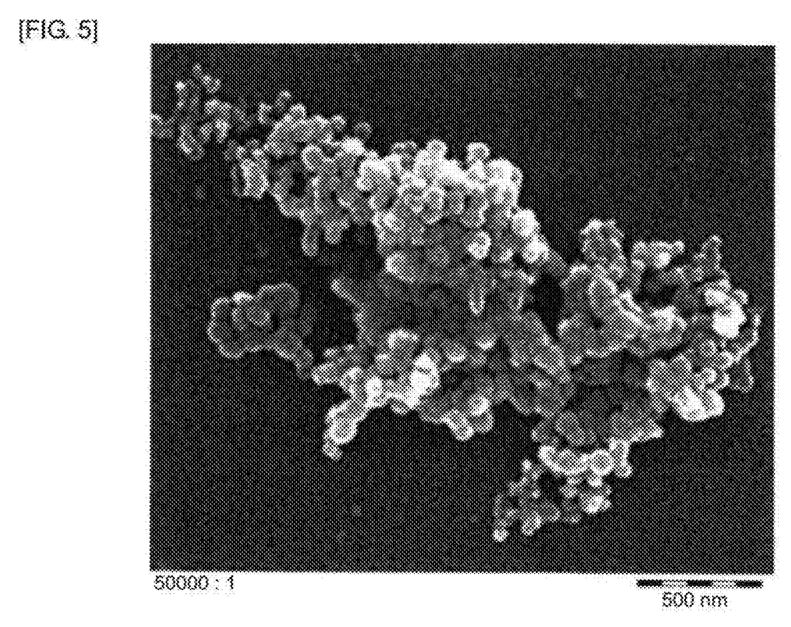
FIG. 5 is a scanning electron microscope (SEM) photographic diagram showing gathered bulk particles in which the aggregated particles shown in FIG. 4 are gathered.

As an example of the fumed oxide powder, the fumed silica powder is produced by injecting a mixed gas of $SiCl_4$, $H_2$ and $O_2$ as vaporizing raw materials from a burner. As shown in FIG. 4, in this producing process, aggregated particles, which are the smallest particle form in which the primary particles of silica are calcinated, are firstly formed, and then, as shown in FIG. 5, aggregated particles are gathered by weak interaction of hydrogen bonding or Van der Waals force to form gathered bulk particles. By subjecting this fumed oxide powder to hydrophobic surface treatment, a hydrophobic fumed oxide powder can be obtained. This hydrophobic fumed oxide powder can be obtained, for example, in the case of a hydrophobic fumed silica powder, by chemically modifying the surface of the fumed silica powder with a silane coupling agent or silicone oil. Incidentally, the "hydrophobicity" of the hydrophobic fumed oxide powder means a property having a hydrophobization rate of preferably 80% or more, and further preferably 90% or more. If the hydrophobization rate of less than 80%, hydrophobicity of the fumed oxide powder is lowered, and water resistance of the insulating filler is lowered.

Further, the surface of each powder of the hydrophobic fumed silica, hydrophobic fumed alumina or hydrophobic fumed titania is modified by a $(R_1)_x(R_2)_y(R_3)_z$Si— group ($R_1$, $R_2$ and $R_3$ are alkyl groups, and X, Y and Z are integers of 0 to 3.). Specifically, as these hydrophobic fumed oxides, there may be mentioned hydrophobic fumed silica (for example, "RY50": hydrophobic fumed silica ($SiO_2$) having an average primary particle size of 40 nm available from NIPPON AEROSIL CO., LTD.), hydrophobic fumed alumina (for example, "C805": hydrophobic fumed alumina ($Al_2O_3$) having an average primary particle size of 13 nm available from Evonik Industries AG), hydrophobic fumed titania (for example, "T805": hydrophobic fumed titania ($TiO_2$) having an average primary particle size of 21 nm available from Evonik Industries AG), etc.

The insulating filler of the present embodiment is prepared by mixing a large-diameter magnesium oxide powder and/or nitride-based inorganic powder and a small-diameter hydrophobic fumed oxide powder under room temperature by a dry method. For this dry mixing, it is preferable to use a rotating and revolving mixer (manufactured by THINKY CORPORATION: model number "ARE-310"), and at the laboratory level, a planetary stirring mixer (manufactured by THINKY CORPORATION: Awatori Rentarou "R250"), etc., can be used.

This insulating filler and a resin, etc., are mixed and stirred by the above-mentioned rotating and revolving mixer to prepare a resin composition. As the resin, etc., there may be mentioned a mixture of an unsaturated polyester resin and a curing agent, a mixture of an epoxy resin and a curing agent, a mixture of EPDM rubber (ethylene-propylene-diene ternary copolymer), a silicone resin and a curing agent, etc. A mixing ratio of the above-mentioned resin, etc., is preferably 10% by volume to 60% by volume, and further preferably 20% by volume to 30% by volume when the total amount of the insulating filler and the resin, etc., is 100% by volume. Here, the reason why the preferred mixing ratio of the resin, etc., is limited to the range of 10% by volume to 60% by volume is that if it is less than 10% by volume, the resin is difficultly molded, while if it exceeds 60% by volume, sufficient water resistance, thermal conductivity and electric insulation can be difficultly imparted to the insulating material which is a resin molded body.

It is preferable that the above-mentioned resin composition is placed in a mold, and the resin is cured using a heat press (for example, manufactured by Kodaira Seisakusho Co., Ltd.: model number "PY15-EA") at a temperature of 130° C. to 200° C. by applying a pressure of 1 MPa to 15 MPa (10 kg/cm' to 150 kg/cm²) and holding it for 5 minutes to 60 minutes to prepare a resin molded body (high thermal conductive insulating material) having high thermal conductivity, high insulating property and high water resistance. Here, the reason why the preferable temperature of the heat press is limited to the range of 130° C. to 200° C. is that if it is lower than 130° C., curing failure is likely to occur, while if it exceeds 200° C., the resin is likely to be deteriorated by heat. Also, the reason why the preferable pressure of the heat press is limited to the range of 1 MPa to 15 MPa (10 kg/cm' to 150 kg/cm²) is that if it is less than 1 MPa (10 kg/cm²), air remains inside thereof and sufficient thermal conductivity is difficultly obtained, while if it exceeds 15 MPa (150 kg/cm²), the load on the compression machine tends to be excessive. Further, the reason why the preferable holding time of the heat press is limited to the range of 5 minutes to 60 minutes is that if it is shorter than 5 minutes, curing tends to be insufficient, while if it exceeds 60 minutes, productivity tends to decrease.

The dielectric breakdown voltage of the resin molded body (high thermal conductive insulating material) is preferably 1 kV/mm or more, and further preferably 3 kV/ram or more. Here, the reason why the preferable dielectric breakdown voltage of the resin molded body (high thermal conductive insulating material) is limited to 1 kV/ram or more is that if it is less than 1 kV/mm, it may not have sufficient electric insulation depending on the place of use. Incidentally, the dielectric breakdown voltage of the resin molded body (high thermal conductive insulating material) is measured by using an ultra-high voltage withstanding voltage tester "7470 series" (manufactured by Keisoku Giken Co., Ltd.: model number "7473"). Further, the above-mentioned resin molded body (high thermal conductive insulating material) can be utilized for cooling members of heating elements comprising semiconductor chips or transistors of in-vehicle electronic devices, cooling members of stators built in housings of motors, cooling members of power conversion devices built in cases of inverters, a heat dissipation member of heat generated in a sliding portion or a rotating portion of an actuator, etc.

EXAMPLES

Next, Examples the present invention will by explained in detail with Comparative Examples.

Example 1

First, a spherical magnesium oxide powder (available from Denka Co., Ltd.: model number "DMG-120" (average primary particle size 108 μm)) was prepared as a large-diameter powder, and hydrophobic fumed silica powder (available from NIPPON AEROSIL CO., LTD.: model number "AEROSIL (Registered trademark) R976" (average primary particle size 7 nm)) was prepared as a small-diameter powder. Next, 74% by mass of the large-diameter powder (spherical magnesium oxide powder) and 26% by mass of the small-diameter powder (hydrophobic fumed silica powder) were mixed (dry mixing) using a rotating and revolving mixer (manufactured by THINKY CORPORATION: model number "ARE-310") at 2,000 rpm for 3 minutes to obtain an insulating filler. This insulating filler was made Example 1. Incidentally, the average primary particle size of the small-diameter powder including Example 1, and other Examples and Comparative Examples mentioned below was measured by an image analysis method of a transmission electron microscope (TEM), and the average primary particle size of the large-diameter powder was made the nominal value of each powder manufacturer.

Examples 2 to 12 and Comparative Examples 1 to 4

In Examples 2 to 12 and Comparative Examples 1 to 4, as shown in Table 1, the model number, material and average primary particle size of the large-diameter powder, and the model number, material and the average primary particle size of the small-diameter powder, and a mixing ratio of the large-diameter powder and the small-diameter powder were each changed, and other than the above were carried out in the same manner as in Example 1 to obtain an insulating filler.

Incidentally, in Table 1, "W15" of the large-diameter powder is a model number of aluminum nitride (AlN) powder having an average primary particle size of 15 μm available from Toyo Aluminium K.K., "DMG-60" of the large-diameter powder is a model number of spherical magnesium oxide (MgO) powder having an average primary particle size of 61 μm available from Denka Co., Ltd., "SGP" of the large-diameter powder is a model number of boron nitride (BN) powder having an average primary particle size of 18 μm available from Denka Co., Ltd., and "BSN-S20LGF" of the large-diameter powder is a model number of boron nitride (BN) powder having an average primary particle size of 20 μm available from Combustion Synthesis Co., Ltd. Also, in Table 1, "RY50L" of the small-diameter powder is a model number of hydrophobic fumed silica ($SiO_2$) powder having an average primary particle size of 40 nm available from NIPPON AEROSIL CO., LTD., "NAX50" of the small-diameter powder is a model number of hydrophobic fumed silica ($SiO_2$) powder having an average primary particle size of 30 nm available from NIPPON AEROSIL CO., LTD., "RY50" of the small-diameter powder is a model number of hydrophobic fumed silica ($SiO_2$) powder having an average primary particle size of 40 nm available from NIPPON AEROSIL CO., LTD., "R805" of the small-diameter powder is a model number of hydrophobic fumed silica ($SiO_2$) powder having an average primary particle size of 12 nm available from Evonik Industries AG, "RX200" of the small-diameter powder is a model number of hydrophobic fumed silica ($SiO_2$) powder having an average primary particle size of 12 nm available from NIPPON AEROSIL CO., LTD., and "RX300" of the small-diameter powder is a model number of hydrophobic fumed silica ($SiO_2$) powder having an average primary particle size of 7 nm available from NIPPON AEROSIL CO., LTD.

Also, in Table 1, "300" of the small-diameter powder is a model number of hydrophilic fumed silica ($SiO_2$) powder having an average primary particle size of 7 nm available from NIPPON AEROSIL CO., LTD., and "R7200" of the small-diameter powder is a model number of hydrophobic fumed silica ($SiO_2$) powder having an average primary particle size of 12 nm available from Evonik Industries AG. Also, in Table 1, "C805" of the small-diameter powder is a model number of hydrophobic fumed alumina ($Al_2O_3$) powder having an average primary particle size of 13 nm available from Evonik Industries AG, and "T805" of the small-diameter powder is a model number of hydrophobic fumed titania ($TiO_2$) powder having an average primary particle size of 21 nm available from Evonik Industries AG.

Also, in Table 1, "AA-3" of the small-diameter powder is a model number of spherical α-alumina ($Al_2O_3$) powder having an average primary particle size of 3.4 μm available from Sumitomo Alumina Co., Ltd., and "AA-04" of the small-diameter powder is a model number of spherical α-alumina ($Al_2O_3$) powder having an average primary particle size of 0.44 μm available from Sumitomo Alumina Co., Ltd. Also, in Table 1, "MF" of the small-diameter powder is a model number of aluminum nitride (AlN) powder having an average primary particle size of 2.5 μm available from Toyo Aluminium K.K., and "P25" of the small-diameter powder is a model number of hydrophilic fumed titania ($TiO_2$) powder having an average primary particle size of 13 nm available from NIPPON AEROSIL CO., LTD. Further, in Table 1, "col-$SiO_2$" of the small-diameter powder is colloidal silica powder having an average primary particle size of 12 nm available from Evonik Industries AG.

On the other hand, in the mixing method "wet method" of Comparative Example 4 in Table 1, with 100% by mass of ethanol as a solvent were mixed 74% by mass of a large-diameter powder (spherical magnesium oxide powder) and 26% by mass of a small-diameter powder (hydrophilic fumed titania powder), the mixture was stirred by a dissolver (DISPERMAT: D-51580 manufactured by VMA-GETZMANN) at 4,000 rpm for 5 minutes, and the obtained slurry was dried and the dried product was pulverized to obtain an insulating filler.

TABLE 1

| | Insulating filler | | | | | | | |
|---|---|---|---|---|---|---|---|---|
| | Large-diameter powder | | | Small-diameter powder | | | | |
| | Model number | Material Average primary particle size | Mixing ratio (% by mass) | Model number | Material Average primary particle size | Mixing ratio (% by mass) | Mixing method | Ratio of average primary particle size (small-diameter/large diameter) | Volume resistivity ($\Omega \cdot m$) |
| Example 1 | DMG-120 | MgO 108 μm | 74 | R976 (hydrophobic) | $SiO_2$ 7 nm | 26 | Dry | $6 \times 10^{-5}$ | $1 \times 10^{14}$ |
| Example 2 | DMG-120 | MgO 108 μm | 95 | RY50L (hydrophobic) | $SiO_2$ 40 nm | 5 | Dry | $4 \times 10^{-4}$ | $1 \times 10^{13}$ |
| Example 3 | DMG-120 | MgO 108 μm | 74 | NAX50 (hydrophobic) | $SiO_2$ 30 nm | 26 | Dry | $3 \times 10^{-4}$ | $1 \times 10^{13}$ |
| Example 4 | W15 | AlN 15 μm | 74 | R976 (hydrophobic) | $SiO_2$ 7 nm | 26 | Dry | $5 \times 10^{-4}$ | $3 \times 10^{13}$ |
| Example 5 | W15 | AlN 15 μm | 74 | RY50 (hydrophobic) | $SiO_2$ 40 nm | 26 | Dry | $3 \times 10^{-3}$ | $4 \times 10^{13}$ |
| Example 6 | DMG-60 | MgO 61 μm | 74 | R805 (hydrophobic) | $SiO_2$ 12 nm | 26 | Dry | $2 \times 10^{-4}$ | $1 \times 10^{14}$ |
| Example 7 | DMG-120 | MgO 108 μm | 74 | 300 (hydrophilic) | $SiO_2$ 7 nm | 26 | Dry | $6 \times 10^{-5}$ | $7 \times 10^{11}$ |
| Example 8 | DMG-120 | MgO 108 μm | 74 | R7200 (hydrophobic) | $SiO_2$ 12 nm | 26 | Dry | $8 \times 10^{-4}$ | $4 \times 10^{13}$ |
| Example 9 | W15 | AlN 15 μm | 74 | C805 (hydrophobic) | $Al_2O_3$ 13 nm | 26 | Dry | $9 \times 10^{-4}$ | $3 \times 10^{11}$ |
| Example 10 | W15 | AlN 15 μm | 74 | T805 (hydrophobic) | $TiO_2$ 21 nm | 26 | Dry | $1 \times 10^{-3}$ | $1 \times 10^{11}$ |
| Example 11 | SGP | BN 18 μm | 74 | RX200 (hydrophobic) | $SiO_2$ 12 nm | 26 | Dry | $7 \times 10^{-4}$ | $5 \times 10^{13}$ |
| Example 12 | BSN-S20 LGF | $Si_3N_4$ 20 μm | 74 | RX300 (hydrophobic) | $SiO_2$ 7 nm | 26 | Dry | $4 \times 10^{-4}$ | $3 \times 10^{13}$ |
| Comparative Example 1 | DMG-120 | MgO 108 μm | 74 | AA-3 | $Al_2O_3$ 3.4 μm | 13 | Dry | $3 \times 10^{-2}$ | $2 \times 10^{8}$ |
| | | | | AA-04 | $Al_2O_3$ 0.44 μm | 13 | | $4 \times 10^{-3}$ | |
| Comparative Example 2 | DMG-120 | MgO 108 μm | 74 | — | col-$SiO_2$ 12 nm | 26 | Dry | $1 \times 10^{-4}$ | $1 \times 10^{9}$ |
| Comparative Example 3 | W15 | AlN 15 μm | 74 | MF | AlN 2.5 μm | 26 | Dry | $2 \times 10^{-1}$ | $7 \times 10^{8}$ |
| Comparative Example 4 | DMG-120 | MgO 108 μm | 74 | P25 (hydrophilic) | $TiO_2$ 13 nm | 26 | Wet | $1 \times 10^{-4}$ | $5 \times 10^{8}$ |

Comparative Test 1

The ratio $D_1/D_2$ of the average primary particle size of the small-diameter powder having the average primary particle size $D_1$ and the large-diameter powder having the average primary particle size $D_2$ of the insulating fillers of Examples 1 to 12 and Comparative Examples 1 to 4 was calculated. In addition, the volume resistivity of the insulating fillers of Examples 1 to 12 and Comparative Examples 1 to 4 was measured by using a high resistance resistivity meter "Hiresta-UX" (manufactured by Mitsubishi Chemical Analytech Co., Ltd.: model number "MCP-HT800") and a powder resistance measurement system (manufactured by Mitsubishi Chemical Analytech Co., Ltd.: model number "MCP-PD-51"). These results are shown in Table 1.

Evaluation 1

As is clear from Table 1, even if the mixing ratio of the small-diameter powder was within the suitable range (5% by mass to 30% by mass) as 26% by mass, in the insulating filler of Comparative Example 1 in which the ratio (small-diameter/large-diameter) of the average primary particle sizes of the small-diameter powder and the large-diameter powder was larger than the suitable range ($6\times10^{-5}$ to $3\times10^{-3}$) as $3\times10^{-2}$ and $4\times10^{-3}$, the volume resistivity was low as $2\times10^8$.

Also, even if the mixing ratio of the small-diameter powder was within the suitable range (5% by mass to 30% by mass) as 26% by mass, and the ratio (small-diameter/large-diameter) of the average primary particle size of the small-diameter powder and the large-diameter powder was within the suitable range ($6\times10^{-5}$ to $3\times10^{-3}$) as $1\times10^{-4}$, in the insulating filler of Comparative Example 2, the volume resistivity was low as $1\times10^9$. It was estimated that it did not have a connection in a bead shape structure.

Further, even if the mixing ratio of the small-diameter powder was within the suitable range (5% by mass to 30% by mass) as 26% by mass, in the insulating filler of Comparative Example 3 in which the ratio (small-diameter/large-diameter) of the average primary particle sizes of the small-diameter powder and the large-diameter powder was larger than the suitable range ($6\times10^{-5}$ to $3\times10^{-3}$) as $2\times10^{-1}$, the volume resistivity was low as $7\times10^8$.

To the contrary, in the insulating fillers of Examples 1 to 12 in which the mixing ratio of the small-diameter powder was within the suitable range as 5% by mass to 30% by mass and the ratio (small-diameter/large-diameter) of the average primary particle sizes of the small-diameter powder and the large-diameter powder was a suitable range as $6\times10^{-5}$ to $3\times10^{-3}$, the volume resistivity was high as $1\times10^{11}$ Ω·m to $1\times10^{14}$ Ω·m.

On the other hand, even if the mixing ratio of the small-diameter powder was within the suitable range (5% by mass to 30% by mass) as 26% by mass, and the ratio (small-diameter/large-diameter) of the average primary particle sizes of the small-diameter powder and the large-diameter powder was within the suitable range ($6\times10^{-5}$ to $3\times10^{-3}$) as $1\times10^{-4}$, in the insulating filler of Comparative Example 4 in which of the small-diameter powder was a model number of "P25" which is hydrophilic fumed titania ($TiO_2$) powder having an average primary particle size of 13 nm available from NIPPON AEROSIL CO., LTD., as used as the small-diameter powder, and using ethanol as a solvent and mixed by the wet method, the volume resistivity was low as $5\times10^8$.

To the contrary, in the insulating fillers of Examples 1 to 12 in which the mixing ratio of the small-diameter powder was within the suitable range as 5% by mass to 30% by mass, the ratio (small-diameter/large-diameter) of the average primary particle sizes of the small-diameter powder and the large-diameter powder was within the suitable range as $6\times10^{-5}$ to $3\times10^{-3}$, and hydrophobic fumed silica, hydrophobic fumed alumina or hydrophobic fumed titania was used as the small-diameter powder and mixed by the dry method, the volume resistivity became high as $1\times10^{11}$ Ω·m to $1\times10^{14}$ Ω·m.

Example 13

First, a spherical magnesium oxide powder (available from Denka Co., Ltd.: model number "DMG-120" (average primary particle size 108 μm)) was prepared as a large-diameter powder, and hydrophobic fumed silica powder (available from NIPPON AEROSIL CO., LTD.: model number "RY50L" (average primary particle size 40 nm)) was prepared as a small-diameter powder. Next, 95% by mass of the large-diameter powder (spherical magnesium oxide powder) and 5% by mass of the small-diameter powder (hydrophobic fumed silica powder) was mixed (dry mixing) using a rotating and revolving mixer (manufactured by THINKY CORPORATION: model number "ARE-310") at 2,000 rpm for 3 minutes to obtain an insulating filler.

Example 14

In the same manner as in Example 13 except for using 90% by mass of a spherical magnesium oxide powder (available from Denka Co., Ltd.: model number "DMG-120" (average primary particle size 108 μm)) as a large-diameter powder, and 10% by mass of a hydrophobic fumed silica powder (available from NIPPON AEROSIL CO., LTD.: model number "RY50L" (average primary particle size 40 nm)) as a small-diameter powder, an insulating filler was obtained.

Example 15

In the same manner as in Example 13 except for using 85% by mass of a spherical magnesium oxide powder (available from Denka Co., Ltd.: model number "DMG-120" (average primary particle size 108 μm)) as a large-diameter powder, and 15% by mass of a hydrophobic fumed silica powder (available from NIPPON AEROSIL CO., LTD.: model number "RY50L" (average primary particle size 40 nm)) as a small-diameter powder, an insulating filler was obtained.

Example 16

In the same manner as in Example 13 except for using 74% by mass of an aluminum nitride powder (available from Toyo Aluminium K.K.: model number "W15" (average primary particle size 15 μm)) as a large-diameter powder, and 26% by mass of hydrophobic fumed silica powder (available from NIPPON AEROSIL CO., LTD.: model number "R976" (average primary particle size 7 nm)) as a small-diameter powder, an insulating filler was obtained.

Example 17

In the same manner as in Example 13 except for using 74% by mass of an aluminum nitride powder (available from Toyo Aluminium K.K.: model number "W15" (average primary particle size 15 μm)) as a large-diameter powder, and 26% by mass of a hydrophobic fumed alumina powder (available from Evonik Industries AG: model number "C805" (average primary particle size 13 nm)) as a small-diameter powder, an insulating filler was obtained.

Comparative Example 5

In the same manner as in Example 13 except for using a spherical magnesium oxide powder (available from Denka Co., Ltd.: model number "DMG-120" (average primary particle size 108 μm)) as a large-diameter powder, and not using the small-diameter powder, an insulating filler was obtained.

Comparative Example 6

In the same manner as in Example 13 except for using an aluminum nitride powder (available from Toyo Aluminium K.K.: model number "W15" (average primary particle size 15 μm)) as a large-diameter powder, and not using the small-diameter powder, an insulating filler was obtained.

"IG401") under the conditions of a temperature of 32° C. and a relative humidity of 80% for 16 days. These results are shown in Table 2.

Evaluation 2

As is clear from Table 2, in the insulating fillers of Examples 13 to 17 in which the mixing ratio of the small-diameter powder was within the suitable range (5% by mass to 30% by mass) as 5% by mass to 26% by mass, and the ratio (small-diameter/large-diameter) of the average primary particle sizes of the small-diameter powder and the large-diameter powder was within the suitable range ($6 \times 10^{-5}$ to $3 \times 10^{-3}$) as $4 \times 10^{-4}$ to $9 \times 10^{-4}$, the volume resistivity before moisture absorption became high as $3 \times 10^{11}$ Ω·m to $1 \times 10^{14}$ Ω·m. In addition, the volume resistivity did not substantially change as $2 \times 10^{11}$ Ω·m to $1 \times 10^{14}$ Ω·m even when moisture was absorbed under constant temperature and high humidity conditions (32° C., a relative humidity of 80%) for 16 days.

To the contrary, in the insulating filler of Comparative Example 5 which consists of a spherical magnesium oxide powder (available from Denka Co., Ltd.: model number

TABLE 2

| | Insulating filler | | | | | | | | | |
|---|---|---|---|---|---|---|---|---|---|---|
| | Large-diameter powder | | | Small-diameter powder | | | | | Volume resistivity | | |
| | Model number | Material Average primary particle size | Mixing rate (% by mass) | Model number | Material Average primary particle size | Mixing rate (% by mass) | Mixing method | Ratio of average primary particle diameter (small-diameter/large-diameter) | Before moisture absorption | After moisture absorption | Lowering rate (%) |
| Example 13 | DMG-120 | MgO 108 μm | 95 | RY50L (hydrophobic) | SiO$_2$ 40 nm | 5 | Dry | $4 \times 10^{-4}$ | $1 \times 10^{14}$ | $1 \times 10^{14}$ | 0 |
| Example 14 | DMG-120 | MgO 108 μm | 90 | RY50L (hydrophobic) | SiO$_2$ 40 nm | 10 | Dry | $4 \times 10^{-4}$ | $1 \times 10^{14}$ | $1 \times 10^{14}$ | 0 |
| Example 15 | DMG-120 | MgO 108 μm | 85 | RY50L (hydrophobic) | SiO$_2$ 40 nm | 15 | Dry | $4 \times 10^{-4}$ | $9 \times 10^{13}$ | $8 \times 10^{13}$ | 11 |
| Example 16 | W15 | AlN 15 μm | 74 | R976 (hydrophobic) | SiO$_2$ 7 nm | 26 | Dry | $5 \times 10^{-4}$ | $3 \times 10^{13}$ | $3 \times 10^{13}$ | 0 |
| Example 17 | W15 | AlN 15 μm | 74 | C805 (hydrophobic) | Al$_2$O$_3$ 13 nm | 26 | Dry | $9 \times 10^{-4}$ | $3 \times 10^{11}$ | $2 \times 10^{11}$ | 33 |
| Comparative Example 5 | DMG-120 | MgO 108 μm | 100 | — | — | 0 | — | — | $1 \times 10^{11}$ | $4 \times 10^{9}$ | 96 |
| Comparative Example 6 | W15 | AlN 15 μm | 100 | — | — | 0 | — | — | $2 \times 10^{10}$ | $1 \times 10^{9}$ | 95 |

Comparative Test 2

Regarding the insulating fillers of Examples 13 to 17 and Comparative Examples 5 and 6, the volume resistivity before and after moisture absorption was measured by using a high resistance resistivity meter "Hiresta-UX" (manufactured by Mitsubishi Chemical Analytech Co., Ltd.: model number "MCP-HT800") and a powder resistance measurement system (manufactured by Mitsubishi Chemical Analytech Co., Ltd.: model number "MCP-PD-51"). Moisture absorption was carried out by leaving the insulating filler in a constant temperature and constant humidity oven (manufactured by Yamato Scientific Co., Ltd.: model number "DMG-120" (average primary particle size 108 μm)) alone as the large-diameter powder without using the small-diameter powder, when moisture was absorbed under constant temperature and high humidity conditions (32° C., a relative humidity of 80%) for 16 days, the volume resistivity was lowered as $4 \times 10^{9}$ Ω·m with two digits as compared with before moisture absorption. In addition, in the insulating filler of Comparative Example 6 which consists of an aluminum nitride powder (available from Toyo Aluminium K.K.: model number "W15" (average primary particle size 15 μm)) alone as the large-diameter powder without using the small-diameter powder, when moisture was absorbed under constant temperature and high humidity conditions (32° C., a relative humidity of 80%) for 16 days, the volume resistivity was lowered as $1 \times 10^9$ Ω·m with one digit as compared with before moisture absorption.

Example 18

First, 22.2% by volume of an unsaturated polyester resin (available from Hitachi Chemical Co., Ltd.: model number "WP2008") as a resin and 0.3% by volume of a curing agent (available from Hitachi Chemical Co., Ltd.: model number "CT50") were mixed to prepare a mixture of the resin. Then, 71.7% by volume of a spherical magnesium oxide powder (available from Denka Co., Ltd.: model number "DMG-120" (average primary particle size 108 μm)) as a large-diameter powder and 5.8% by volume of a hydrophobic fumed silica powder (available from NIPPON AEROSIL CO., LTD.: model number "RY50L" (average primary particle size 40 nm)) as a small-diameter powder were mixed to prepare a mixed powder. This mixed powder was mixed by a rotating and revolving mixer (manufactured by THINKY CORPORATION: model number "ARE-310") at 2,000 rpm for 3 minutes to obtain an insulating filler. Next, the mixture of the above-mentioned resin and the insulating filler were mixed by the above-mentioned rotating and revolving mixer at 2,000 rpm for 5 minutes to prepare a resin composition. Further, this resin composition is placed in a mold having a length×width×depth of a cavity of 15 cm×15 cm×2 mm, and the resin was cured using a heat press (manufactured by Kodaira Seisakusho Co., Ltd.: model number "PY15-EA") at a temperature of 130° C. and applying a pressure of 10 MPa (100 kg/cm$^2$) and maintaining for 10 minutes to prepare an insulating material comprising a resin molded body.

Example 19

First, 22.1% by volume of an unsaturated polyester resin (available from Hitachi Chemical Co., Ltd.: model number "WP2008") as a resin and 0.3% by volume of a curing agent (available from Hitachi Chemical Co., Ltd.: model number "CT50") were mixed to prepare a mixture of the resin. Then, 71.6% by volume of a spherical magnesium oxide powder (available from Denka Co., Ltd.: model number "DMG-60" (average primary particle size 61 μm)) as a large-diameter powder and 6.0% by volume of a hydrophobic fumed silica powder (available from NIPPON AEROSIL CO., LTD.: model number "RY50L" (average primary particle size 40 nm)) as a small-diameter powder were mixed to prepare a mixed powder. In the same manner as in Example 18 except for the above, an insulating material comprising a resin molded body was prepared.

Example 20

First, 20.2% by volume of an unsaturated polyester resin (available from Hitachi Chemical Co., Ltd.: model number "WP2008") as a resin and 0.3% by volume of a curing agent (available from Hitachi Chemical Co., Ltd.: model number "CT50") were mixed to prepare a mixture of the resin. Then, as a mixed powder A, 57.3% by volume of a spherical magnesium oxide powder (available from Denka Co., Ltd.: model number "DMG-120" (average primary particle size 108 μm)) as a large-diameter powder and 9.8% by volume of a hydrophobic fumed silica powder (available from NIPPON AEROSIL CO., LTD.: model number "RY50L" (average primary particle size 40 nm)) as a small-diameter powder were mixed with a rotating and revolving mixer (manufactured by THINKY CORPORATION: model number "ARE-310") at 2,000 rpm for 3 minutes to obtain an insulating filler A. Subsequently, as a mixed powder B, 10.3% by volume of an aluminum nitride powder (available from Toyo Aluminium K.K.: model number "TFZ-S30P" (average primary particle size 28 μm)) as a large-diameter powder and 2.1% by volume of a hydrophobic fumed silica powder (available from NIPPON AEROSIL CO., LTD.: model number "VP RX40S" (average primary particle size 40 nm)) as a small-diameter powder were mixed with a rotating and revolving mixer (manufactured by THINKY CORPORATION: model number "ARE-310") at 2,000 rpm for 3 minutes to obtain an insulating filler B. Next, the above-mentioned mixture of the resin, the insulating filler A and the insulating filler B were mixed by the above-mentioned rotating and revolving mixer at 2,000 rpm for 5 minutes to prepare a resin composition. In the same manner as in Example 18 except for the above, an insulating material comprising a resin molded body was prepared.

Example 21

First, 20.2% by volume of an unsaturated polyester resin (available from Hitachi Chemical Co., Ltd.: model number "WP2008") as a resin and 0.3% by volume of a curing agent (available from Hitachi Chemical Co., Ltd.: model number "CT50") were mixed to prepare a mixture of the resin. Then, as a mixed powder A, 56.9% by volume of a spherical magnesium oxide powder (available from Denka Co., Ltd.: model number "DMG-60" (average primary particle size 61 μm)) as a large-diameter powder and 10.0% by volume of a hydrophobic fumed silica powder (available from NIPPON AEROSIL CO., LTD.: model number "RY50L" (average primary particle size 40 nm)) as a small-diameter powder were mixed, and it was' mixed with a rotating and revolving mixer (manufactured by THINKY CORPORATION: model number "ARE-310") at 2,000 rpm for 3 minutes to obtain an insulating filler A. Subsequently, as a mixed powder B, 10.5% by volume of an aluminum nitride powder (available from Toyo Aluminium K.K.: model number "TFZ-S30P" (average primary particle size 28 μm)) as a large-diameter powder and 2.1% by volume of a hydrophobic fumed silica powder (available from NIPPON AEROSIL CO., LTD.: model number "VP RX40S" (average primary particle size 40 nm)) as a small-diameter powder were mixed, and it was mixed with a rotating and revolving mixer (manufactured by THINKY CORPORATION: model number "ARE-310") at 2,000 rpm for 3 minutes to obtain an insulating filler B. Next, the above-mentioned mixture of the resin, the insulating filler A and the insulating filler B were mixed by the above-mentioned rotating and revolving mixer at 2,000 rpm for 5 minutes to prepare a resin composition. In the same manner as in Example 18 except for the above, an insulating material comprising a resin molded body was prepared.

Example 22

First, 23.7% by volume of a silicone resin (available from Toray Dow Corning Co., Ltd.: model number "BY16-801") as a resin and 1.3% by volume of oxime silane as a curing agent were mixed to prepare a mixture of the resin. Then, as a mixed powder, 63.0% by volume of a silicon nitride powder (available from Combustion Synthesis Co., LTd.: model number "BSN-S20LGF" (average primary particle size 20 μm)) as a large-diameter powder and 12.0% by volume of a hydrophobic fumed silica powder (available from NIPPON AEROSIL CO., LTD.: model number "RX300" (average primary particle size 7 nm)) as a small-diameter powder were mixed with a rotating and revolving mixer (manufactured by THINKY CORPORATION: model number "ARE-310") at 2,000 rpm for 3 minutes to obtain an insulating filler. In the same manner as in Example 18 except for the above, an insulating material comprising a resin molded body was prepared.

Example 23

First, 25.0% by volume of an epoxy resin (available from Mitsubishi Chemical Corporation: model number "JER828") was prepared as a resin. Then, as a mixed powder, 63.5% by volume of a boron nitride powder (available from Denka Co., Ltd.: model number "SGP" (average primary particle size 18 μm)) as a large-diameter powder and 11.5% by volume of a hydrophobic fumed silica powder (available from NIPPON AEROSIL CO., LTD.: model number "RX200" (average primary particle size 12 nm)) as a small-diameter powder were mixed, and it was mixed with a rotating and revolving mixer (manufactured by THINKY CORPORATION: model number "ARE-310") at 2,000 rpm for 3 minutes to obtain an insulating filler. In the same manner as in Example 18 except for the above, an insulating material comprising a resin molded body was prepared.

Comparative Example 7

First, 24.6% by volume of an unsaturated polyester resin (available from Hitachi Chemical Co., Ltd.: model number "WP2008") as a resin and 0.4% by volume of a curing agent (available from Hitachi Chemical Co., Ltd.: model number "CT50") were mixed to prepare a mixture of the resin. Then, the above-mentioned mixture of the resin and 75.0% by volume of a spherical magnesium oxide powder (available from Denka Co., Ltd.: model number "DMG-120" (average primary particle size 108 μm)) as a large-diameter powder were mixed by the above-mentioned rotating and revolving mixer at 2,000 rpm for 5 minutes to prepare a resin composition. The small-diameter powder was not mixed. In the same manner as in Example 18 except for the above, an insulating material comprising a resin molded body was prepared.

Comparative Example 8

First, 24.6% by volume of an unsaturated polyester resin (available from Hitachi Chemical Co., Ltd.: model number "WP2008") as a resin and 0.4% by volume of a curing agent (available from Hitachi Chemical Co., Ltd.: model number "CT50") were mixed to prepare a mixture of the resin. Then, the above-mentioned mixture of the resin and 75.0% by volume of a spherical magnesium oxide powder "DMG-60" (average primary particle size 61 μm)) as a large-diameter powder were mixed by the above-mentioned rotating and revolving mixer at 2,000 rpm for 5 minutes to prepare a resin composition. The small-diameter powder was not mixed. In the same manner as in Example 18 except for the above, an insulating material comprising a resin molded body was prepared.

Incidentally, in Table 3, "P" such as the resin, etc., is a mixture of an unsaturated polyester resin (available from Hitachi Chemical Co., Ltd.: model number "WP2008", 100 parts by weight) and a curing agent (available from Hitachi Chemical Co., Ltd.: model number "CT50", 1.5 parts by weight). "Q" such as the resin, etc., is a mixture of a silicone resin (available from Toray Dow Corning Co., Ltd.: model number "BY16-801", 100 parts by weight) and oxime silane (5 parts by weight) as a curing agent. "R" such as the resin, etc., is an epoxy resin with a model number "JER828" available from Mitsubishi Chemical Corporation.

On the other hand, in Table 3, "DMG-120" of the large-diameter powder is a model number of a spherical magnesium oxide (MgO) powder having an average primary particle size of 108 μm available from Denka Co., Ltd., "DMG-60" of the large-diameter powder is a model number of a spherical magnesium oxide (MgO) powder having an the average primary particle size of 61 μm available from Denka Co., Ltd., "TFZ-S30P" of the large-diameter powder is a model number of an aluminum nitride (AlN) powder having an average primary particle size of 28 μm available from Toyo Aluminium K.K., "BSN-S20LGF" of the large-diameter powder is a model number of a silicon nitride ($Si_3N_4$) powder having an average primary particle size of 20 μm available from Combustion Synthesis Co., LTd., and "SGP" of the large-diameter powder is a model number of a boron nitride (BN) powder having an average primary particle size of 18 μm available from Denka Co., Ltd.

Also, in Table 3, "RY50L" of the small-diameter powder is a model number of a hydrophobic fumed silica ($SiO_2$) powder having an average primary particle size of 40 nm available from NIPPON AEROSIL CO., LTD., "VP RX40S" of the small-diameter powder is a model number of a hydrophobic fumed silica ($SiO_2$) powder having an average primary particle size of 40 nm available from NIPPON AEROSIL CO., LTD., "RX300" of the small-diameter powder is a model number of a hydrophobic fumed silica ($SiO_2$) powder having an average primary particle size of 7 nm available from NIPPON AEROSIL CO., LTD., and "RX200" of the small-diameter powder is a model number of a hydrophobic fumed silica ($SiO_2$) powder having an average primary particle size of 12 nm available from NIPPON AEROSIL CO., LTD.

TABLE 3

| | Resin composition | | | | | | | Resin molded body | | |
|---|---|---|---|---|---|---|---|---|---|---|
| | Resin, etc. | | Large-diameter powder | | Small-diameter powder | | Ratio of average primary particle diameter (small-diameter/large-diameter) | Dielectric breakdown voltage (kV/mm) | | |
| | Kind | Mixing ratio (% by volume) | Model number Material Average primary particle size | Mixing ratio (% by volume) | Model number Material Average primary particle size | Mixing ratio (% by volume) | | Before immersion | After immersion | Rate of change (%) |
| Example 18 | P | 22.5 | DMG-120 MgO 108 μm | 71.7 | RY50L $SiO_2$ 40 nm | 5.8 | $4 \times 10^{-4}$ | 5.12 | 5.35 | 4.5 |

TABLE 3-continued

| | | Resin, etc. | | Resin composition Large-diameter powder | | Small-diameter powder | | Ratio of average primary particle diameter (small-diameter/large-diameter) | Resin molded body Dielectric breakdown voltage (kV/mm) | | |
|---|---|---|---|---|---|---|---|---|---|---|---|
| | Kind | Mixing ratio (% by volume) | Model number Material Average primary particle size | Mixing ratio (% by volume) | Model number Material Average primary particle size | Mixing ratio (% by volume) | | | Before immersion | After immersion | Rate of change (%) |
| Example 19 | P | 22.4 | DMG-60 MgO 61 μm | 71.6 | RY50L SiO$_2$ 40 nm | 6.0 | $7 \times 10^{-4}$ | | 3.33 | 3.31 | 0.6 |
| Example 20 | P | 20.5 | DMG-120 MgO 108 μm | 57.3 | RY50L SiO$_2$ 40 nm | 9.8 | $4 \times 10^{-4}$ | | 7.43 | 7.41 | 0.3 |
| | | | TFZ-S30P AlN 28 μm | 10.3 | VP RX40S SiO$_2$ 40 nm | 2.1 | $1 \times 10^{-3}$ | | | | |
| Example 21 | P | 20.5 | DMG-60 MgO 61 μm | 56.9 | RY50L SiO$_2$ 40 nm | 10.0 | $7 \times 10^{-4}$ | | 7.16 | 7.23 | 1.0 |
| | | | TFZ-S30P AlN 28 μm | 10.5 | VP RX40S SiO$_2$ 40 nm | 2.1 | $1 \times 10^{-3}$ | | | | |
| Example 22 | Q | 25.0 | BSN-S20LFG Si3N4 20 μm | 63.0 | RX300 SiO$_2$ 7 nm | 12.0 | $4 \times 10^{-4}$ | | 4.17 | 4.05 | 2.9 |
| Example 23 | R | 25.0 | SGP BN 18 μm | 63.5 | RX200 SiO$_2$ 12 nm | 11.5 | $7 \times 10^{-4}$ | | 3.05 | 3.03 | 0.7 |
| Comparative Example 7 | P | 25.0 | DMG-120 MgO 108 μm | 75.0 | — | 0 | — | | 3.35 | 2.97 | 11.3 |
| Comparative Example 8 | P | 25.0 | DMG-60 MgO 61 μm | 75.0 | — | 0 | — | | 3.01 | 2.74 | 9.0 |

Comparative Test 3

Regarding the insulating materials comprising the resin molded bodies (thickness 2 mm) of Examples 18 to 23 and Comparative Examples 7 to 8, dielectric breakdown voltage before immersion and after immersion was measured using an ultra-high voltage withstanding voltage tester "7470 series" (manufactured by Keisoku Giken Co., Ltd.: model number "7473"), and the value obtained by dividing the value by the thickness (2 mm) was defined as the dielectric breakdown voltage (kV/ram). Immersion with water was carried out by immersing an insulating material comprising a resin molded body in ion-exchanged water and holding it at 50° C. for 5 days. After immersion, the insulating material comprising the resin molded body was pulled up from water, and dried it at 135° C. for 6 hours. The rate of change of the dielectric breakdown voltage before immersion and after immersion was calculated based on the above-mentioned equation (2). There are cases where the dielectric breakdown voltage becomes high and becomes low due to immersion, so that the difference of the dielectric breakdown voltage before immersion and after immersion is expressed by an absolute value, and this difference is divided by the dielectric breakdown voltage before immersion and expressed by a percentage. The results are shown in Table 3.

Evaluation 3

As is clear from Table 3, in the insulating materials comprising the resin molded bodies of Comparative Examples 7 and 8 wherein an unsaturated polyester resin of a model number of "WP2008" available from Hitachi Chemical Co., Ltd., was used as the resin, a model number of "CT50" available from Hitachi Chemical Co., Ltd., was used as the curing agent, and spherical magnesium oxide powders of model numbers of "DMG-120" and "DMG-60" available from Denka Co., Ltd., were used as the large-diameter powder, but no small-diameter powder was used, whereas the dielectric breakdown voltage before immersion was high as 3 kV/ram or more, the dielectric breakdown voltage after immersion was lowered about 10% even though the immersion conditions were short as 120 hours at 50° C. Specifically, the rate of change of the dielectric breakdown voltage before and after immersion was 11.3% in the insulating material of Comparative Example 7, and 9.0% in the insulating material of Comparative Example 8.

To the contrary, in the insulating materials comprising the resin molded bodies of Examples 18 to 23 in which the large-diameter powder and the small-diameter powder were filled with the predetermined ratio to the resin and the curing agent, further the ratio (small-diameter/large-diameter) of the average primary particle sizes of the small-diameter powder and the large-diameter powder was in the suitable range ($6 \times 10^{-5}$ to $3 \times 10^{-3}$) as $4 \times 10^{-4}$ to $1 \times 10^{-3}$, and further the hydrophobic fumed silica was used as a small-diameter powder and mixed by the dry method, there occurred substantially no lowering in the dielectric breakdown voltage after immersion and these became high as 3 kV/ram or more whereby these became insulating materials having high reliability to water resistance. Specifically, the rate of change of the dielectric breakdown voltage before and after immersion was 0.3% to 4.5% in the insulating materials of Examples 18 to 23.

INDUSTRIAL APPLICABILITY

The insulating material containing the insulating filler of the present invention can be utilized in cooling members for heating elements comprising semiconductor chips, transistors, lithium ion secondary batteries or LED light sources of communication devices or in-vehicle electronic devices, in cooling members for stators built in housings of motors, in cooling members for power conversion devices built in cases of inverters, or in heat dissipation members for releasing heat generated in sliding portions or rotating portions of actuators, etc.

The invention claimed is:

1. An insulating filler which comprises a mixed powder in which on a surface of a magnesium oxide powder and/or a nitride-based inorganic powder having an average primary particle size $D_2$, a hydrophobic fumed oxide powder having an average primary particle size $D_1$ which is smaller than the average primary particle size $D_2$ is attached,
wherein a ratio $D_1/D_2$ of the average primary particle size $D_1$ to the average primary particle size $D_2$ is $6 \times 10^{-5}$ to $3 \times 10^{-3}$,
wherein volume resistivity of the mixed powder is $1 \times 10^{11}$ Ω·m or more, and
wherein a content ratio of the hydrophobic fumed oxide powder is 5% by mass to 30% by mass when the mixed powder is made 100% by mass.

2. The insulating filler according to claim 1, wherein the nitride-based inorganic powder is one or more kinds selected from the group consisting of an aluminum nitride powder, a boron nitride powder and a silicon nitride powder.

3. The insulating filler according to claim 1, wherein the hydrophobic fumed oxide is hydrophobic fumed silica, hydrophobic fumed alumina or hydrophobic fumed titania.

4. The insulating filler according to claim 1, wherein when water vapor is absorbed under a constant temperature and constant humidity of a temperature of 32° C. and a relative humidity of 80% for 16 days, a lowering rate (%) of the volume resistivity by moisture absorption calculated by the following equation (1) is less than +50%;

lowering rate (%) of volume resistivity by moisture absorption=[(volume resistivity before moisture absorption−volume resistivity after moisture absorption)/volume resistivity before moisture absorption]×100     (1)

5. A method for producing an insulating filler by mixing a magnesium oxide powder and/or nitride-based inorganic powder having an average primary particle size $D_2$, and a hydrophobic fumed oxide powder having an average primary particle size $D_1$ which is smaller than the average primary particle size $D_2$ under room temperature by a dry method,
wherein a ratio $D_1/D_2$ of the average primary particle size $D_1$ to the average primary particle size $D_2$ is $6 \times 10^{-5}$ to $3 \times 10^{-3}$.

6. An insulating material comprising a resin molded body, wherein the insulating filler according to claim 1 is contained in the resin molded body, and
wherein when the resin molded body is immersed in water at a temperature of 50° C. for 120 hours, a rate of change (absolute value) of the dielectric breakdown voltage before and after immersion calculated by the following equation (2) is 5% or less;

rate of change (%) in dielectric breakdown voltage due to immersion=[(dielectric breakdown voltage before immersion−dielectric breakdown voltage after immersion)/dielectric breakdown voltage before immersion]×100     (2)

7. A method for producing an insulating material comprising a resin molded body, which comprises mixing the insulating filler according to claim 1 and a resin under room temperature, and then, molding.

* * * * *